(12) United States Patent
Gerum

(10) Patent No.: US 7,934,492 B2
(45) Date of Patent: May 3, 2011

(54) METHOD AND DEVICE FOR IMPROVING A RECIRCULATION OF EXHAUST GAS IN AN INTERNAL COMBUSTION ENGINE

(75) Inventor: Eduard Gerum, Rosenheim (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/729,807

(22) Filed: Mar. 23, 2010

(65) Prior Publication Data

US 2010/0175671 A1 Jul. 15, 2010

Related U.S. Application Data

(63) Continuation of application No. PCT/EP2008/007765, filed on Sep. 17, 2008.

(30) Foreign Application Priority Data

Sep. 24, 2007 (DE) .......................... 10 2007 045 623

(51) Int. Cl.
*F02M 25/07* (2006.01)
(52) U.S. Cl. .............................. 123/568.21; 123/568.18
(58) Field of Classification Search ............. 123/568.11, 123/568.12, 568.18
See application file for complete search history.

(56) References Cited

U.S. PATENT DOCUMENTS

| | | | |
|---|---|---|---|
| 4,270,508 A | 6/1981 | Lindberg | |
| 4,426,848 A * | 1/1984 | Stachowicz | 123/568.12 |
| 5,611,203 A * | 3/1997 | Henderson et al. | 60/605.2 |
| 5,611,204 A | 3/1997 | Radovanovic et al. | |
| 5,974,802 A * | 11/1999 | Blake | 123/568.12 |
| 6,408,833 B1 * | 6/2002 | Faletti | 123/568.17 |
| 6,484,500 B1 * | 11/2002 | Coleman et al. | 123/568.11 |
| 6,502,397 B1 * | 1/2003 | Lundqvist | 60/605.2 |
| 6,732,524 B2 | 5/2004 | Sponton | 123/568.12 |
| 6,742,335 B2 * | 6/2004 | Beck et al. | 123/568.11 |
| 6,886,544 B1 * | 5/2005 | Bui | 123/568.18 |
| 6,895,752 B1 * | 5/2005 | Holtman et al. | 123/568.12 |
| 7,036,529 B2 * | 5/2006 | Berggren et al. | 123/568.17 |
| 7,040,305 B2 * | 5/2006 | Sponton | 123/568.18 |

(Continued)

FOREIGN PATENT DOCUMENTS

DE 42 35 794 C1 10/1993

(Continued)

OTHER PUBLICATIONS

German Office Action dated May 5, 2008 including English translation (Eight (8) pages).
International Search Report dated Dec. 30, 2008 (Three (3) pages).

*Primary Examiner* — Stephen K Cronin
*Assistant Examiner* — Arnold Castro
(74) *Attorney, Agent, or Firm* — Crowell & Moring LLP

(57) ABSTRACT

A method and apparatus for improving recirculation of exhaust gas in an internal combustion engine having an exhaust-gas turbocharger, in particular in a diesel engine, determines operation parameters of the engine in order to determine exhaust gas pressures, supplies compressed air in a controlled manner based on the exhaust gas pressures in order to generate a vacuum in a supply section of a gas supply device, thereby inducting a partial quantity of exhaust gas from the engine into the supply section using the vacuum, and recirculates the partial quantity of exhaust gas into the engine via an induction line connected to the gas supply device.

11 Claims, 2 Drawing Sheets

U.S. PATENT DOCUMENTS

| | | | |
|---|---|---|---|
| 7,076,952 B1 * | 7/2006 | Vetrovec | 123/565 |
| 7,353,811 B2 * | 4/2008 | Weisz | 123/568.17 |
| 7,353,812 B1 * | 4/2008 | Gosdzinski et al. | 123/585 |
| 2002/0069862 A1 * | 6/2002 | Faletti | 123/568.17 |
| 2004/0007220 A1 * | 1/2004 | Sponton | 123/568.18 |
| 2004/0099257 A1 * | 5/2004 | Berggren et al. | 123/568.17 |
| 2006/0124116 A1 * | 6/2006 | Bui | 123/568.18 |
| 2008/0066467 A1 | 3/2008 | Nemeth et al. | |

FOREIGN PATENT DOCUMENTS

| | | |
|---|---|---|
| DE | 43 19 380 A1 | 12/1993 |
| DE | 44 29 232 C1 | 9/1995 |
| DE | 10 2006 008 783 A1 | 9/2006 |
| DE | 10 2006 008 785 A1 | 3/2007 |
| EP | 1 213 467 A2 | 6/2002 |

* cited by examiner

US 7,934,492 B2

METHOD AND DEVICE FOR IMPROVING A RECIRCULATION OF EXHAUST GAS IN AN INTERNAL COMBUSTION ENGINE

CROSS-REFERENCE TO RELATED APPLICATIONS

This application is a continuation of PCT International Application No. PCT/EP2008/007765, filed Sep. 17, 2008, which claims priority under 35 U.S.C. §119 from German Patent Application No. DE 10 2007 045 623.0, filed Sep. 24, 2007, the entire disclosures of which are herein expressly incorporated by reference.

BACKGROUND AND SUMMARY OF THE INVENTION

The invention relates to a method and to an apparatus for improving exhaust gas recirculation in an internal combustion engine, in particular a diesel engine, having an exhaust gas turbocharger.

Recirculating exhaust gases is used as one way of reducing emissions of pollutants, such as, for example, nitrogen oxides $NO_x$, in internal combustion engines. This involves recirculating a portion of the exhaust gases of the internal combustion engine back into its intake system, for example by opening and closing an exhaust gas recirculation valve in a controlled manner. Internal combustion engines, such as diesel engines, are frequently equipped with exhaust gas turbochargers.

However, it is possible when recirculating exhaust gas for states to occur in the transient region in which the exhaust gas pressure is not sufficient for the portion removed via the exhaust gas recirculation system to be conveyed into the intake line or the intake manifold of the internal combustion engine. In such an operating state, there consequently results an excessively high content of $NO_x$ in the exhaust gases.

Such internal combustion engines, for example piston machines such as diesel engines, with an exhaust gas turbocharger have, for example, an operating state during acceleration which is referred to as "turbo lag". Here, when stepping on the gas, the internal combustion engine reacts with a speed increase only after a defined delay period in which no exhaust gas energy, i.e. insufficient exhaust gas pressure, is available for driving the exhaust gas turbocharger, and hence no compressed fresh gas is available. Proposed solutions for overcoming this "turbo lag" have been described in laid-open specifications DE 10 2006 008 783 A1 and DE 10 2006 008 785 A1. They involve introducing compressed air, for example from a compressed air accumulator, into the intake line of the internal combustion engine in a controlled manner in order to cover an increased demand for fresh gas in the internal combustion engine. This takes place by means of a component which is arranged in the intake line between the compressor of the turbocharger and the intake manifold and which comprises a compressed air connection and a controlled flap. The controlled flap is closed when feeding in compressed air, with the result that the compressed air is directed to flow into the intake line rather than into the compressor of the exhaust gas turbocharger.

It is therefore the object of the present invention to provide a method and an apparatus for improving exhaust gas recirculation wherein the above disadvantages are obviated or significantly reduced and further advantages are obtained.

A fundamental idea behind the invention comprises making use of a vacuum for sucking in recirculated exhaust gas, this vacuum being created when blowing compressed air into the intake line of the internal combustion engine.

As a result of this, it is advantageously ensured that the states occurring in transient operating regions of the internal combustion engine where exhaust gases have excessively high nitrogen oxide contents are eliminated or considerably reduced.

A method according to the invention for improving exhaust gas recirculation in an internal combustion engine, in particular a diesel engine, having an exhaust gas turbocharger comprises the following method steps: determining operating parameters of the internal combustion engine in order to determine pressure values of the exhaust gas; controlled feeding of compressed air based on the pressure values thus determined for the exhaust gas in order to generate a vacuum in a feed section of a gas feed device; sucking a portion of exhaust gas of the internal combustion engine into the feed section of the gas feed device with the vacuum generated; and recirculating the thus sucked-in portion of the exhaust gas into the internal combustion engine via an intake line connected to the gas feed device.

The compressed air is blown in at a high pressure via a controlled valve, for example a solenoid or pneumatic valve. Here, very high flow viscosities, preferably equal to the speed of sound, of the blown-in compressed air occur directly behind the outlet of the valve in a small region. In this region then prevails a considerably lower pressure than in the intake line of the internal combustion engine.

In a further embodiment, it is preferred to design this region as a venturi arrangement, with the result that the vacuum produced is particularly pronounced. In this vacuum region, the portion of recirculated exhaust gas is sucked in by the vacuum. As an alternative, use can also be made of an injector pump arrangement.

Particularly when the internal combustion engine is in an operating state in which the exhaust gas pressure is low, compressed air is blown in while exhaust gas that is to be recirculated is sucked in. The compressed air valve is switched on when pressure values of the exhaust gas, which are measured directly or indirectly, fall below a predefinable value. Then, the vacuum builds up and a recirculating valve in the exhaust gas recirculation system is switched on to open it such that the portion of exhaust gas that is to be recirculated is sucked in.

The sucked-in exhaust gas that is to be recirculated is blown together with the compressed air into the intake line of the internal combustion engine. To ensure that the compressed air and the sucked-in exhaust gas can be directionally guided into the intake line, provision can be made for a setting element which directionally steers the flow into the intake line.

An apparatus according to the invention for improving exhaust gas recirculation in an internal combustion engine, in particular a diesel engine, having an exhaust gas turbocharger, comprises the following: an exhaust gas recirculation device which is connected to an exhaust gas line and to an intake line of the internal combustion engine; a recirculating valve arranged in the exhaust gas recirculation device and intended for the controlled switching on of exhaust gas recirculation; and a gas feed device which is arranged between the intake line and a compressor of the exhaust gas turbocharger and coupled to a compressed air line, wherein the gas feed device further comprises an intake duct with a connection for the exhaust gas recirculation device, and wherein the intake duct leads into a feed section of the compressed air line.

Provision is made in a preferred embodiment for the gas feed device to comprise, upstream and downstream of the setting element in the flow direction, measuring devices for measuring flow parameters in the gas feed device. This makes it possible in a simple manner to obtain measurement values, for example, on the current intake pressure in the intake line, the measuring devices being pressure sensors, for example. The intake pressure and further measurement values, for example from the engine control unit, such as the speed of the internal combustion engine, can be used to infer the exhaust gas pressure as well.

In a further embodiment, the gas feed device is a fresh gas line section of a device for fresh air supply for blowing in compressed air in a controlled manner. This gives a combination of the advantages provided by blowing in compressed air in terms of the so-called "turbo lag" and the improved exhaust gas recirculation.

Other objects, advantages and novel features of the present invention will become apparent from the following detailed description of one or more preferred embodiments when considered in conjunction with the accompanying drawings.

Identical components or functional units having an identical function are designated by identical reference signs in the figures.

DETAILED DESCRIPTION OF THE DRAWINGS

Figure 1:
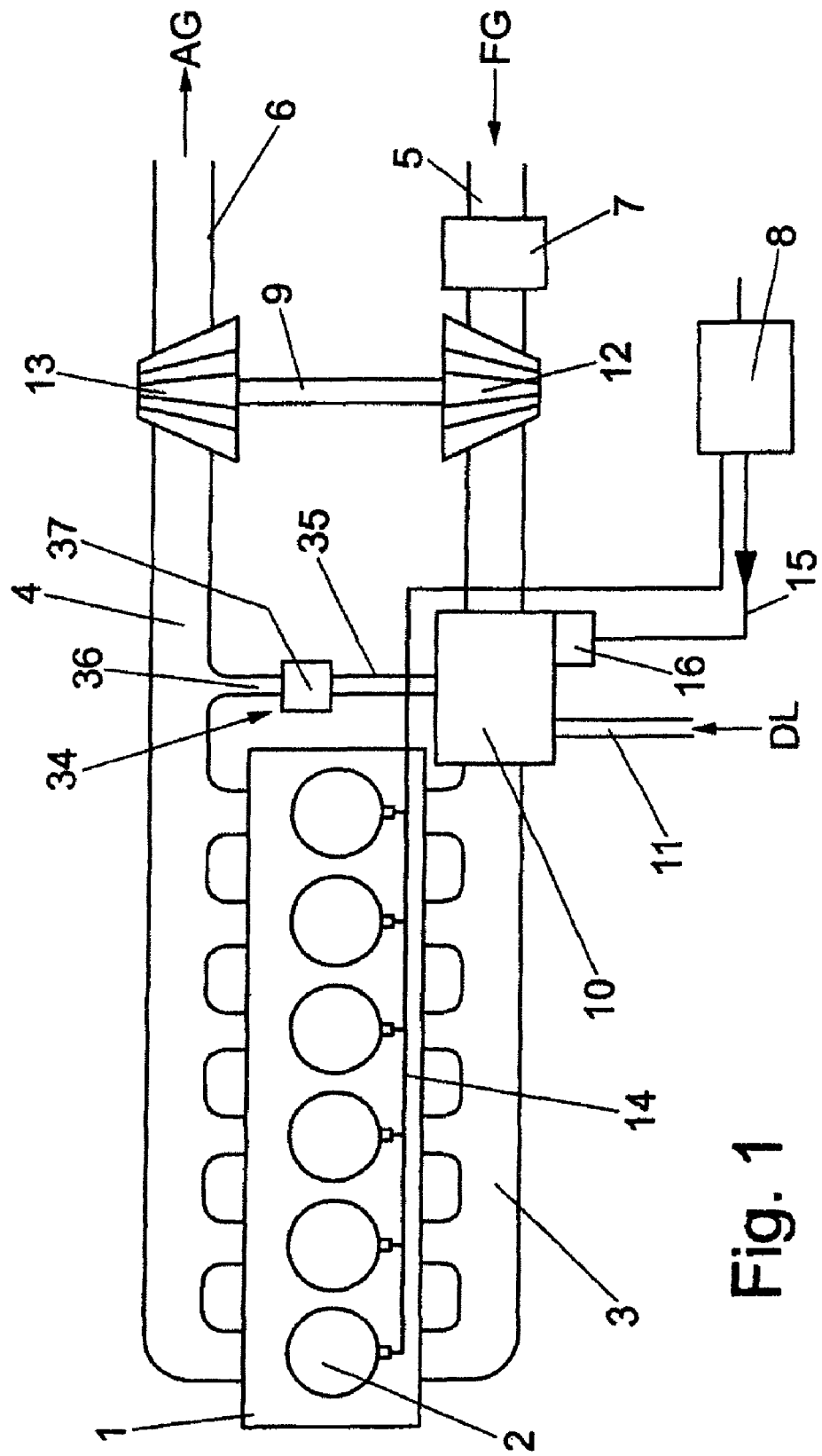
FIG. 1 shows a schematic representation of an internal combustion engine with an exhaust gas turbocharger, an exhaust gas recirculation system and an apparatus according to an embodiment of the invention for improving the exhaust gas recirculation.

FIG. 1 shows a schematic representation of an internal combustion engine 1 having an exhaust gas turbocharger 9, an exhaust gas recirculation device 34 and an apparatus according to the invention for improving the exhaust gas recirculation. The internal combustion engine 1 in this example is a diesel engine having six cylinders 2, an intake line 3 and an exhaust gas line 4. The intake line 3 is connected to a compressor 12 of the exhaust gas turbocharger 9 via a gas feed device 10 which is connected via an air filter 7 to the air inlet 5 for fresh gas FG. The compressor 12 of the exhaust gas turbocharger 9 is coupled to an exhaust gas turbine 13 which is arranged in the exhaust gas line 4 upstream of an exhaust gas outlet 6 for exhaust gas AG of the internal combustion engine 1 and is driven by the exhaust gas AG.

Furthermore, the exhaust gas line 4 is coupled via the exhaust gas recirculation device 34 to the intake line 3 via the gas feed device 10, which will be described in more detail below. The exhaust gas recirculation device 34 is divided into a first and second delivery line section 35 and 36. Between these delivery lines is arranged a recirculating valve 37 which, for example, can be a solenoid valve or a pneumatic valve.

The gas feed device 10 is further connected to a compressed air line 11 for feeding in compressed air DL. The compressed air DL is, for example, stored in a compressed air tank and/or generated by a compressed air system (not shown). For example, this may be a system for generating compressed air that is present in a commercial vehicle or an additional system.

An engine control module 8 is connected to injection systems of the cylinders 2. In this regard, only one control line 14 is depicted symbolically. A further connection 15 is connected to a control unit 16 of the gas feed device 10. The engine control module 8 controls the internal combustion engine in a known manner and will not be explained further. Via the connection 15 are obtained further measurement data of the gas feed device 10, which will be explained in more detail below.

The gas feed device 10 in this example is a fresh gas line section, such as described in DE 10 2006 008 783 A1 and DE 10 2006 008 785 A1 in conjunction with an associated means for generating compressed air. Hence, a detailed description will not be given here.

Figure 2:
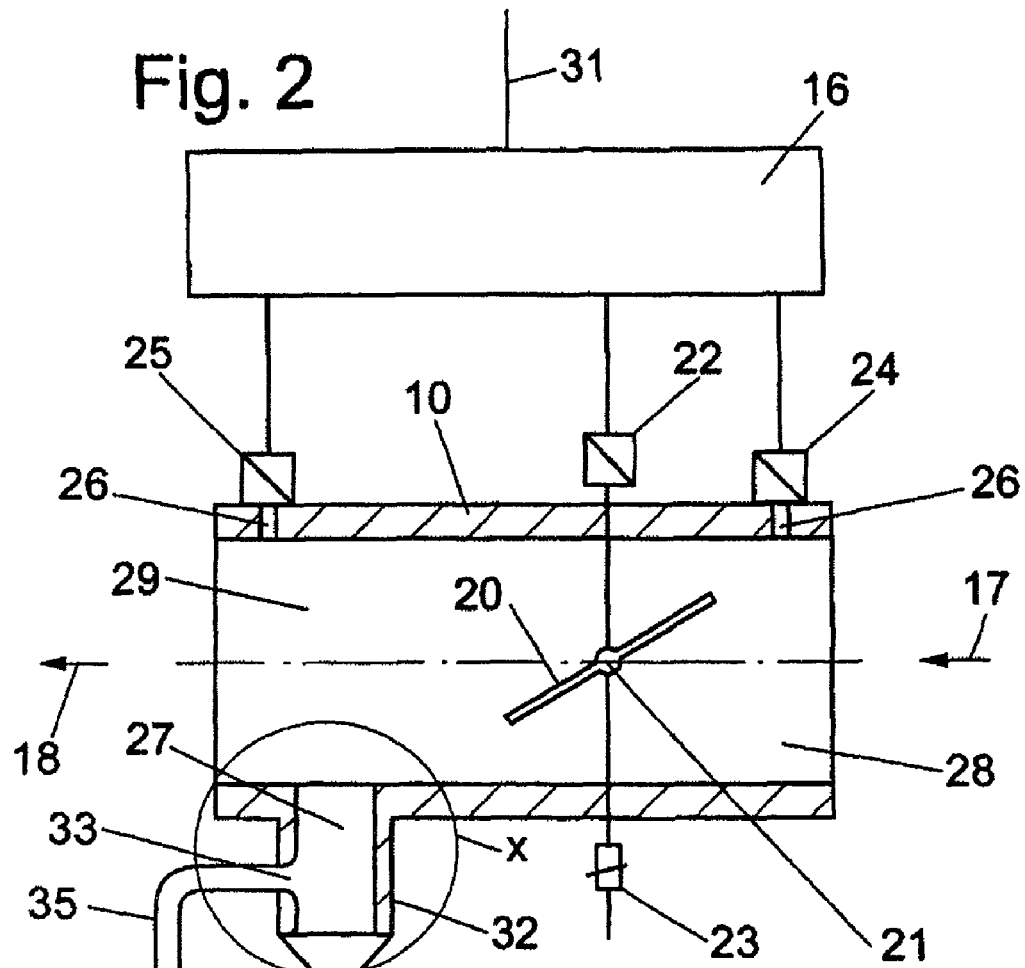
FIG. 2 shows a schematic sectional representation of an embodiment of a gas feed device of the apparatus according to the invention.
Figure 3:
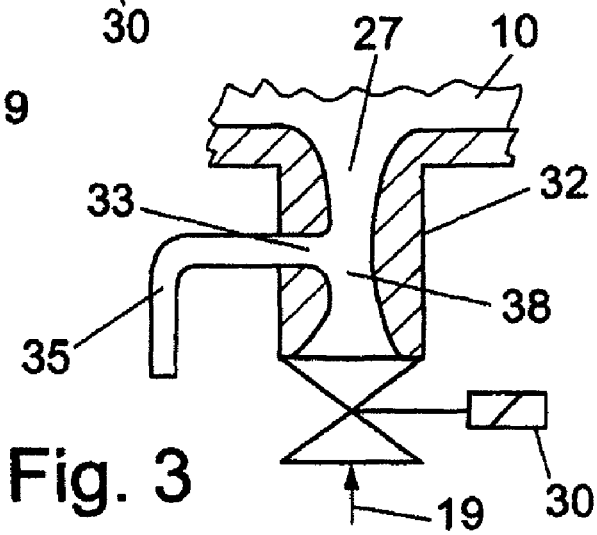
FIG. 3 shows an enlarged schematic sectional representation of a connection section X according to FIG. 2, showing a further embodiment of the gas feed device of the apparatus according to the invention.

The gas feed device 10, together with associated functional units, is schematically represented in the embodiment in FIG. 2 in a longitudinal sectional view.

The gas feed device 10 comprises a tubular body which is connected on its right-hand side to the compressor 12 of the exhaust gas turbocharger 9 (see FIG. 1) by way of an inflow section 28 for a fresh gas inflow 17. In the flow direction (from right to left in FIG. 2), furthermore, a setting element 20 in the form of a flap is arranged such that it can be pivoted about an axis of rotation 21. The setting element 20 is coupled to an adjusting unit 22 and a position sensor 23. The setting element 20 makes it possible to have a variable passage cross section for the tubular body of the gas feed device 10, and hence a variable inflow 17.

In the left-hand region of the gas feed device 10 is arranged an outflow section 29 which is connected to the intake line 3 for an outflow 18 (see FIG. 1). In this example, a connection section 32 having a feed section 27 is arranged at the underside in the outflow section 29, wherein the feed section 27 is designed in the form of a duct and communicates by one end with the outflow section 29. The other end of the feed section 27 is connected to a valve 30, which in this case is designed as an electromagnetic valve and has its connection side designed for a compressed air inflow 19 of the compressed air line 11 (see FIG. 1). Above the outlet of the valve 30, the connection section 32 is connected to an intake duct 33 which communicates with the first delivery line section 35 of the exhaust gas recirculation device 34. This first delivery line section 35 is adjoined by the recirculating valve 37 and the second delivery line section 36, which is connected to the exhaust gas line 4 (see FIG. 1), the arrow being intended to symbolize this situation. The recirculating valve 37 in this example is likewise an electromagnetic valve.

The gas feed device 10 additionally comprises two measuring ducts 26, one in the inflow section 28 upstream of the setting element 20 in the flow direction, and one in the outflow section 29 downstream of the setting element 20 in the flow direction. To each measuring duct 26 is connected a measuring device 24, 25, each being a pressure sensor in this example.

The control unit 16 of the gas feed device 10 is connected to the adjusting unit 22 and to the position sensor 23 of the control element 20, to the measuring devices 24, 25 and to the valves 30 and 37. Furthermore, it is connected to the engine control module 8 and has a connection 31 for further attachments, such as, for example, pressure sensors, temperature sensors, etc., of the exhaust gas line and/or of the exhaust gas turbocharger.

The operation of this apparatus will now be described.

If the exhaust gas pressure decreases on account of a certain operating condition of the internal combustion engine 1, this is detected by sensors of the internal combustion engine 1, such as, for example, sensors for speed, pressure and temperature. These measurement values are available in the engine control module 8 and—in the presence of a bus system in the vehicle—on this bus and can be called up by the control unit 16, for example via the connection 15 with the engine control module 8 and/or via the connection 31. From these values the control unit 16 determines, by comparison with predefined threshold values, that the exhaust gas pressure has fallen below these threshold values and that exhaust gas recirculation is therefore no longer possible. Now, the valve 30 is opened by the control unit, and the inflowing compressed air DL is under a very high pressure and, as a result of its high flow velocity, which is preferably equal to the speed of sound, generates a high vacuum in the feed section 27 at the outlet of the valve 30. Then, the recirculating valve 37 opens, controlled by a further signal from the control unit 16, and a portion of exhaust gas is sucked into the feed section 27 through the exhaust gas recirculation device 34 and taken along by the inflowing compressed air. At the same time, the control unit 16 sends a signal to the adjusting unit 22 of the control element 20 to close or to reduce the cross section with respect to the inflow section 28, with the result that the flow of compressed air together with the recirculated exhaust gas is guided as a directed outflow 18 into the intake line 3 into the internal combustion engine 1. As the operating conditions change, the valves 30 and 37 are closed again and the control element 20 is correspondingly adjusted to increase the cross section with respect to the inflow section 29.

It is thus possible to obtain exhaust gas recirculation even with a low exhaust gas pressure, which means that a reduced nitrogen oxide content is achieved in the exhaust gases AG even during transient operation of the internal combustion engine 1.

It is possible to increase the vacuum in the feed section 27 by adapting the geometry of this section such that a particularly favourable vacuum and suction condition is created for the recirculated exhaust gas. In this respect, FIG. 2 shows a sectional representation of the region X shown in FIG. 2 in a further embodiment of the apparatus according to the invention. The feed section 27 here is designed as a venturi arrangement 38. In the region of the largest flow velocity, in which the largest vacuum prevails when the valve 30 is opened and compressed air flows in, is arranged the intake duct 33 together with the connected first delivery line 35 of the exhaust gas recirculation device 34, thereby making it possible, by virtue of the vacuum, to recirculate more exhaust gas when there is a low exhaust gas pressure in the exhaust gas line 4 (FIG. 1) and thus further reduce the nitrogen oxide content of the exhaust gases AG.

The invention is not limited to the above-described exemplary embodiments. It can be modified within the scope of the appended claims.

Thus, it is conceivable, for example, for the geometric arrangement of the feed section 27 to have other arrangements than venturi arrangements. For example, use can be made of an injector pump arrangement (in the manner of a water jet pump), wherein the fed-in compressed gas inflow 19 is guided through the injector. The injector in this case projects from the lower end of the connection section 32 into the feed section, a situation which, although not shown, can easily be contemplated.

A further configuration of all the ducts, lead-ins and connections in a manner which is favourable to flow produces lower flow resistances, in particular in the region of high pressure or vacuum.

The valves can also be pneumatically or electropneumatically controllable.

The gas feed device 10 can be a fresh gas line section of the compressed air device described in DE 10 2006 008 783 A1 and DE 10 2006 008 785 A1 and be coupled to this device.

| Table of Reference Numerals | |
|---|---|
| 1 | Internal combustion engine |
| 2 | Cylinder |
| 3 | Intake line |
| 4 | Exhaust gas line |
| 5 | Air inlet |
| 6 | Exhaust gas outlet |
| 7 | Air filter |
| 8 | Engine control module |
| 9 | Exhaust gas turbocharger |
| 10 | Gas feed device |
| 11 | Compressed air line |
| 12 | Compressor |
| 13 | Exhaust gas turbine |
| 14 | Control line |
| 15 | Connection |
| 16 | Control unit |
| 17 | Fresh gas inflow |
| 18 | Outflow |
| 19 | Compressed air inflow |
| 20 | Setting element |
| 21 | Axis of rotation |
| 22 | Adjusting unit |
| 23 | Position sensor |
| 24 | First measuring device |
| 25 | Second measuring device |
| 26 | Measuring duct |
| 27 | Feed section |
| 28 | Inflow section |
| 29 | Outflow section |
| 30 | Valve |
| 31 | Connection |
| 32 | Connection section |
| 33 | Intake duct |
| 34 | Exhaust gas recirculation device |
| 35 | First delivery line section |
| 36 | Second delivery line section |
| 37 | Recirculating valve |
| 38 | Venturi arrangement |
| AG | Exhaust gas |
| DL | Compressed air |
| FL | Fresh gas |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for improving exhaust gas recirculation in an internal combustion engine having an exhaust gas turbocharger, comprising the acts of:
   determining operating parameters of the internal combustion engine from which pressure values of the exhaust gas are determinable;
   determining the pressure values from the operating parameters;
   controlled feeding of compressed air into a feed section of a gas feed device based on the determined exhaust gas pressure values to generate a vacuum; and drawing a portion of exhaust gas into the feed section of the gas feed device using the vacuum to recirculated exhaust gas into the engine via an intake line between the gas feed device and the engine, wherein the controlled feeding of compressed air is performed by switching on a compressed air valve when at least one of the determined exhaust gas pressure values falls below a predefined comparison value.

2. The method according to claim 1, wherein the compressed air is fed in at the speed of sound.

3. The method according to claim 1, wherein, after the compressed air valve has been switched on, a recirculating valve is switched on to permit the portion of exhaust gas to be drawn into the gas field device.

4. The method according to claim 1, wherein the compressed air is guided through one of a venturi and an injector pump into which the portion of exhaust gas is introduced.

5. The method according to claim 4, wherein the drawn in portion of exhaust gas is directionally guided into the intake line by a setting element.

6. An apparatus for improving exhaust gas recirculation in an internal combustion engine having an exhaust gas turbocharger, comprising:
- an exhaust gas recirculation device connected to an exhaust gas line and to a gas feed device of the internal combustion engine;
- a recirculating valve arranged in the exhaust gas recirculation device, the recirculating valve being configured to control switching on of exhaust gas recirculation; and
- wherein the gas feed device is
  - arranged between the intake line and a compressor of the exhaust gas turbocharger,
  - coupled to a compressed air line, and
  - includes an intake duct arranged to receive exhaust gas from the exhaust gas recirculation device the intake duct being arranged to conduct exhaust gas into a feed section of the compressed air line in the gas feed device, the feed section being connected to the compressed air line via a compressed air valve; and
- wherein the controlled feeding of compressed air is performed by switching on a compressed air valve when at least one of the determined exhaust gas pressure values falls below a predefined comparison value.

7. The apparatus according to claim 6, wherein the feed section includes a venturi arrangement.

8. The apparatus according to claim 6, wherein the feed section includes an injector pump arrangement, wherein an injector is arranged to guide the compressed air flowing in through the compressed air line.

9. The apparatus according to claim 8, wherein the gas feed device further comprises a setting element arranged to guide recirculating exhaust gas in a predetermined direction into the intake line.

10. An apparatus according to claim 9, wherein the gas feed device includes measuring devices for measuring gas flow parameters in the gas feed device arranged upstream and downstream of the setting element.

11. An apparatus according to claim 6, wherein the gas feed device is a fresh gas line section of a device for fresh air supply for blowing in compressed air in a controlled manner.

* * * * *